United States Patent
Smith

(10) Patent No.: US 8,833,456 B1
(45) Date of Patent: *Sep. 16, 2014

(54) SEAWATER TRANSPORTATION FOR UTILIZATION IN HYDROCARBON-RELATED PROCESSES INCLUDING PIPELINE TRANSPORTATION

(71) Applicant: Seawater Technologies, LLC, Snyder, TX (US)

(72) Inventor: Brent Smith, Snyder, TX (US)

(73) Assignee: Seawater Technologies, LLC, Snyder, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/972,589

(22) Filed: Aug. 21, 2013

Related U.S. Application Data

(60) Provisional application No. 61/821,792, filed on May 10, 2013, provisional application No. 61/837,921, filed on Jun. 21, 2013.

(51) Int. Cl.
*E21B 43/26* (2006.01)

(52) U.S. Cl.
CPC ....................................... *E21B 43/26* (2013.01)
USPC .................... 166/305.1; 166/308.1; 166/90.1; 166/243

(58) Field of Classification Search
USPC ............ 166/308.1–308.5, 90.1, 75.15, 177.5, 166/243
See application file for complete search history.

(56) References Cited

U.S. PATENT DOCUMENTS

| | | | |
|---|---|---|---|
| 6,439,310 B1* | 8/2002 | Scott et al. .................. | 166/308.1 |
| 7,669,670 B2* | 3/2010 | Pinto Bascompte ............ | 175/61 |
| 2003/0183389 A1* | 10/2003 | Lord et al. ..................... | 166/300 |
| 2004/0040713 A1* | 3/2004 | Nguyen et al. ................ | 166/295 |
| 2004/0200616 A1* | 10/2004 | Chatterji et al. .............. | 166/267 |
| 2005/0006491 A1* | 1/2005 | Lin ................................ | 239/2.1 |
| 2005/0016732 A1* | 1/2005 | Brannon et al. ........... | 166/308.1 |
| 2005/0173116 A1* | 8/2005 | Nguyen et al. ............. | 166/280.2 |
| 2006/0243441 A1* | 11/2006 | Cornelius de Grood et al. .......................... | 166/280.2 |
| 2007/0193746 A1* | 8/2007 | Brannon et al. ........... | 166/280.2 |
| 2008/0093123 A1* | 4/2008 | Pinto Bascompte ............ | 175/45 |
| 2008/0237141 A1* | 10/2008 | Kerfoot ......................... | 210/739 |
| 2009/0095482 A1* | 4/2009 | Surjaatmadja ............. | 166/305.1 |
| 2010/0224495 A1* | 9/2010 | McGuire et al. .............. | 204/667 |
| 2011/0284228 A1* | 11/2011 | Huang et al. ............... | 166/308.1 |
| 2013/0206415 A1* | 8/2013 | Sheesley .................... | 166/308.1 |
| 2013/0233542 A1* | 9/2013 | Shampine et al. ............ | 166/279 |

OTHER PUBLICATIONS

Thesaurus entry for "seawater", accessed Nov. 3, 2013 via thefreedictionary.com.*

(Continued)

*Primary Examiner* — Blake Michener
(74) *Attorney, Agent, or Firm* — Andrew Rush; PCT Law Group

(57) ABSTRACT

Systems and methods for transporting seawater from a seawater source to an inland site for utilization as a drilling and/or fracturing fluid are disclosed. In an aspect, systems and methods are disclosed wherein seawater is extracted from an ocean at a coastal location and transported to an inland drilling and hydraulic fracturing site via a pipeline, thereby providing a consistent, large volume supply of seawater for use in drilling and/or hydraulic fracturing operations. Such systems and methods may eliminate usage of locally-sourced fresh water, eliminating the unsustainable burden that drilling and hydraulic fracturing places on local water tables.

18 Claims, 8 Drawing Sheets

(56) References Cited

OTHER PUBLICATIONS

Dictionary entry for "freight train", accessed Nov. 3, 2013 via thefreedictionary.com.*

Schlumberger Oilfield Glossary entries for "hydraulic fracturing" and "flowback", accessed Nov. 3, 2013 via www.glossary.oilfield.slb.clm.*

Dictionary definitions of "ocean", "sea" and "brine", accessed Feb. 5, 2014 via thefreedictionary.com.*

\* cited by examiner

US 8,833,456 B1

SEAWATER TRANSPORTATION FOR UTILIZATION IN HYDROCARBON-RELATED PROCESSES INCLUDING PIPELINE TRANSPORTATION

CROSS-REFERENCE TO RELATED APPLICATIONS

This application claims the benefit of U.S. Provisional Patent Application No. 61/821,792, filed May 10, 2013, and entitled "Transporting Seawater for Utilization in Hydrocarbon-Related Processes," the entire contents of which is incorporated herein by reference.

This application claims the benefit of U.S. Provisional Patent Application No. 61/837,921, filed Jun. 21, 2013, and entitled "Seawater Transportation For Utilization In Hydrocarbon-Related Processes Including Rail Transportation," the entire contents of which is incorporated herein by reference.

FIELD OF THE DISCLOSURE

The present disclosure generally relates to hydrocarbon extraction processes and more particularly to systems and methods for utilizing seawater in drilling and hydraulic fracturing processes.

BACKGROUND

The statements in this section merely provide background information related to the present disclosure and may not constitute prior art.

Hydraulic fracturing processes are used to, among other things, extract subterranean oil. These processes require significant amounts of water to operate. A single oil or gas well may require three to thirteen million gallons of water. Land-based hydraulic fracturing sites currently utilize locally-sourced fresh water, placing an enormous, unsustainable strain on the local water table.

Currently, areas of significant drilling, such as Texas, have devoted as much as ten percent of local fresh water usage to drilling and hydraulic fracturing operations. According to the Texas Water Development Board and the Railroad Commission of Texas, the State's oil and gas regulator, in 2011, Texas used a greater number of barrels of water for oil and natural gas fracking (approximately 632 million) than the number of barrels of oil produced (approximately 441 million). Water consumption is expected to rise as drilling operations expand. For example, by 2035, the U.S. Energy Information Administration expects nearly 80% of the 21 trillion cubic feet of natural gas produced annually to be from "unconventional" sources such as hydraulically fractured shale. Furthermore, such processes stress arid, fragile ecosystems because many of the most oil-rich portions of the United States (e.g., Eagle Ford Shale and the Permian Basin) are the driest. Some average less than 21 inches of rainfall a year. The current rate of land-based hydraulic fracturing, notwithstanding projected growth, cannot be sustained using fresh water alone.

Hydraulic fracturing processes, also known as "fracking," "fracing," or "fraccing," are used to release hydrocarbons and other substances contained in subterranean rock formations via high pressure injection of a fracturing fluid, such as fresh water, into the rock formation.

In recent years, hydraulic fracturing has been widely used to access previously unreachable deposits of oil and natural gas. As of 2010, 60% of all new oil and gas wells worldwide were created using hydraulic fracturing. Because vast amounts of formerly inaccessible oil and gas can be extracted using hydraulic fracturing, it is likely that usage of such processes will increase in the future.

The fracturing fluid comprises water and low concentrations of chemical additives, depending on the characteristics of the water and the rock formation being fractured. For example, the fracturing fluid may comprise so-called slickwater additives, adapted to reduce friction, allowing the fracturing fluid to be pumped into the fracture at a higher rate than if water alone were used. Slickwater additives typically make up less than two percent of the fracturing fluid and must be adjusted for each rock formation or "play." Borate salts and potassium chloride (a metal halide salt commonly used as a substitute for table salt) are also common fracturing fluid additives.

After injection, a portion of the fracturing fluid returns to the surface. Such returning fluid is known as "produced water." Produced water, generated from hydraulic fracturing or normal production of oil and gas wells, typically has a higher concentration of salt, other compounds, elements, and impurities. Produced water may be re-used in the hydraulic fracturing process, however only 40-50% of initially-injected fracturing fluid returns to the surface. Therefore, additional fracturing fluid must be continually added even when produced water is reused. Because of its heavy salinity and impurity concentration, produced water must be removed, cleaned, or reused. Most often, produced water is re-injected into disposal wells or re-injected into injection wells used to maintain the reservoir pressure.

Hydraulic fracturing has been used to create offshore oil wells. For example, large hydraulic fracturing vessels have been employed to open wells in the North Sea, the Arabian Sea, off the western coast of Africa and off the Unites States Gulf Coast. Initially, offshore hydraulic fracturing processes used fracturing fluids comprising fresh water. Fresh water proved to be a major limitation because it was carried out to sea via tankers with limited cargo capacity. Later offshore hydraulic fracturing processes began utilizing a fracturing fluid comprising seawater. Seawater is simply collected from the surrounding ocean, processed, and injected into the fracturing site, thereby eliminating the production bottleneck of a limited fracturing fluid supply.

Given the foregoing, systems and methods for transporting seawater from a plentiful source (e.g., an ocean, saltwater lake, brine source, and the like) to a hydraulic fracturing site are needed. Additionally, systems and methods for transporting, processing and utilizing produced water generated during hydraulic fracturing processes are needed. Systems and methods for transporting seawater and produced water to areas with plentiful resources for de-salinization, additional hydraulic fracturing sites, storage areas, and processing areas, are needed.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing systems and methods for transporting seawater from a source to an oilfield drilling site and/or a hydraulic fracturing site. Specifically, in an aspect, systems and methods are disclosed wherein seawater is pumped from an ocean at a coastal location and transported to an inland site via a pipeline, thereby providing a consistent, large volume supply of seawater for use in operations such as drilling for oil and natural gas, hydraulic fracturing operations, and the like.

In an aspect, a large diameter pipeline originates at an extraction station, such as a pumping station, located at a seawater source (e.g., the United States Gulf of Mexico), enabling seawater to be pumped from the seawater source into the pipeline. The pipeline extends inland to an area near a hydrocarbon-laden rock formation, such as the Haynesville Shale Formation located under parts of southwestern Arkansas, northwest Louisiana, and east Texas. Transported seawater is received at an inland site (e.g., a drilling or hydraulic fracturing site) located near the rock formation and is then used to augment or replace fresh water utilization at the inland site. That is, the drilling "mud," hydraulic fracturing fluids, and/or other fluids using in drilling or hydraulic fracturing processes may comprise seawater sourced from a seawater source, such as the United States Gulf of Mexico, and fresh water. In another aspect, such fluids comprise seawater sourced from the sea and does not comprise fresh water.

As of 2010, 60% of new oil and gas wells are created using water-intensive hydraulic fracturing processes. Each new oil and gas well created using hydraulic fracturing may use three to 13 million gallons of fresh water, placing enormous strain on local water tables, such as the Ogallala. Usage of seawater sourced from a large supply such as the Gulf of Mexico or another seawater source (e.g., an ocean, saltwater lake, brine source, and the like) eliminates usage of fresh water from local, finite water tables, enabling drilling for oil and natural gas, hydraulic fracturing, and other related processes to continue or expand without depleting local water tables or paying for that rapidly decreasing resource.

In an aspect, existing pipelines may be adapted for utilization with the present disclosure. That is, seawater may be transported from the Gulf of Mexico, the Atlantic Ocean, the Pacific Ocean, or similar saltwater body, reservoir, or any other location, to an inland site (e.g., oilfield drilling sites, hydraulic fracturing sites) using existing pipelines. In some aspects, a portion of a seawater transportation system in accordance with the present disclosure is constructed so that it interconnects a seawater source with an existing pipeline. A delivery pipeline may be constructed so that it originates at a portion of the existing pipeline proximal to the inland site and terminates at the inland site.

In an aspect, a seawater transportation system is configured to transport seawater from a seawater source to a hydraulic fracturing site. Utilization of such seawater generates produced water having higher concentrations of salt, other compounds, and elements. Produced water must disposed of, reused, or cleaned. A portion of the pipeline may be used to transport produced water to a second site. The second site may be a disposal site, a desalinization site, another hydraulic fracturing site, and the like.

In an aspect, systems and methods are disclosed wherein seawater is pumped from a plentiful source of seawater (e.g., an ocean) and transported to an inland site via a seawater transportation system which comprises rail-based transports. Seawater may be loaded onto tanker cars and carried by rail to a location at or near an inland site, thereby providing a consistent, large volume supply of seawater for use in oilfield drilling operations, hydraulic fracturing operations, and the like.

A seawater transportation system comprising rail-based transports may further comprise one or more pipelines to transport seawater.

In an aspect, seawater transportation systems comprise alternative transportation devices including, but not limited to: air transportation; commercial vehicles; and ships. Such transportation devices may carry seawater the entire distance between the plentiful source of seawater and the inland site, or a portion of the distance.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to systems and methods for utilizing seawater to augment or replace utilization of fresh water in drilling and fracturing fluids; the latter being used for hydraulic fracturing processes.

Aspects of the present disclosure provide systems and methods for transporting seawater from an oceanic source to an inland site (e.g., an oilfield drilling site, a hydraulic fracturing site, an oil well, a natural gas well, a combination site, and the like). Specifically, in an aspect, systems and methods are disclosed wherein seawater is pumped from a body of water at a coastal location and transported to an inland drilling and hydraulic fracturing site via a pipeline, thereby providing a consistent, large volume supply of seawater for use in drilling and hydraulic fracturing operations.

Unless otherwise noted, for the purposes of the present disclosure, "seawater" refers to water originating from a source of water containing large amounts of salt, such as the ocean, salt water lakes, a brine source, and the like.

Figure 1B:
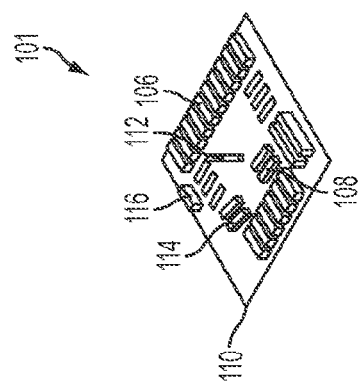
FIGS. 1A & 1B are diagrams of an exemplary inland site where hydraulic fracturing and natural gas drilling occur, which may be augmented by systems and processes of the present disclosure.
Figure 1A:
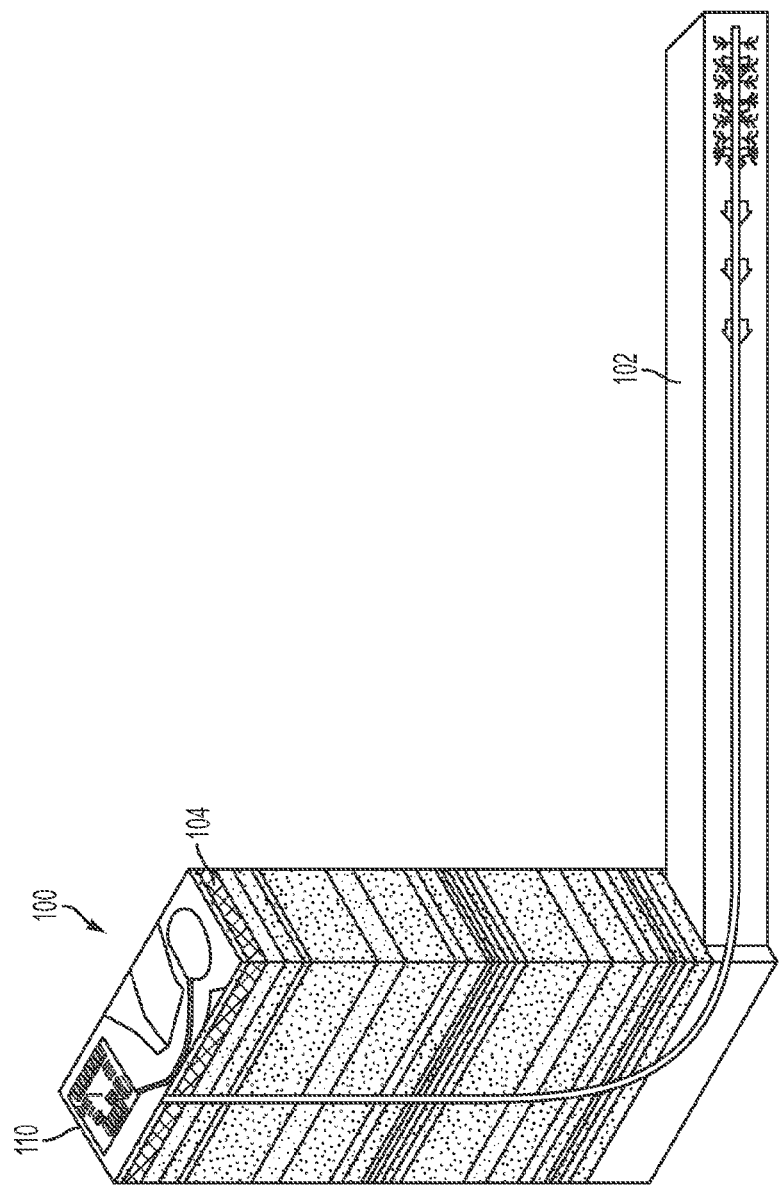

Referring now to FIGS. 1A & 1B, diagrams 100, 101 of an exemplary inland site where hydraulic fracturing and natural gas drilling occur, which may be augmented by systems and processes of the present disclosure, are shown.

As shown in diagram 101, hydraulic fracturing processes may occur at an inland site 110 comprising one or more wellbores 112. Hydraulic fracturing processes create fractures in subterranean hydrocarbon-bearing formations 102 in order to release hydrocarbons contained therein. In the United States, hydraulic fracturing is increasingly implemented in order to create new oil and gas wells which tap into oil and gas contained within shale rock formations. Shale formations may be 8,000 feet or more below the surface.

Hydraulic fracturing processes release hydrocarbons trapped in subterranean hydrocarbon-bearing formations 102 via high pressure injection of a fracturing fluid at wellbore 112. The fracturing fluid typically principally comprises fresh water, sourced from a local aquifer 104. As shown in FIG. 1, hydraulic fracturing utilizes water from local aquifer 104. Water may be stored in one or more storage tanks 106 (labeled, for clarity, only as storage tank 106 in FIG. 1B) until the water (or other base fluid, such as seawater, disclosed in detail below) is needed.

A base fluid, such as freshwater from aquifer 104 or seawater, may be combined with one or more proppants and one or more additives to form the fracturing fluid. In another aspect, the base fluid, or some combination of the base fluid and one or more additional elements, such as a proppant (e.g., bentonite) or a chemical additive, may be used as a drilling fluid.

Proppants may be silica sand, resin-coated sand, ceramics, particulates, and the like, and serve to keep an induced hydraulic fracture open during or following a fracturing treatment. Proppants may be stored on site in proppant storage facility 116.

The fracturing fluid may comprise slickwater additives, adapted to reduce friction, allowing the fracturing fluid to be pumped into the fracture at a higher rate than if water alone were used. Additives vary based on the characteristics of the base fluid and the rock formation being fractured. Slickwater additives typically make up less than two percent of the fracturing fluid and must be adjusted for each rock formation or play. Borate salts and potassium chloride, a metal halide salt commonly used as a substitute for table salt, are also common fracturing fluid additives. Because salts may be used as additives in fracturing fluids and offshore drilling and hydraulic fracturing utilizes seawater as a base fluid, land-based hydraulic drilling and fracturing processes may be adapted to utilize seawater-based fracturing fluids.

Additives may also include one or more of: biocides, buffers, corrosion inhibitors, crosslinkers, friction reducers, gelling agents, scale inhibitors, and surfactants. Additives may be stored at inland site 110 in additive storage tank 114.

Additives and proppants may be combined with a base fluid to form a drilling or hydraulic fracturing fluid via one or more mixers 108 (labeled, for clarity, only as mixer 108 in FIG. 1B). Mixer 108 may be fluidically connected to a storage tank 106, additive storage tank 114, wellbore 112, a high-pressure pump, or the like.

Inland site 110 may further comprise base fluid processing equipment (not shown in FIGS. 1A & 1B) such as a water treatment facility configured to remove at least one contaminant from the base fluid (e.g., via filters). In alternate aspects, a water treatment facility is configured to remove one or more of the following: biological matter; plastic debris; metals; pesticides; artificially created chemicals; and radioactive material.

Inland site 110 may be adapted to measure physical properties (e.g., chemical content, pH, and the like) of the base fluid and add at least one additive based on the measured physical properties of the base fluid. In an aspect, the base fluid is seawater and the pH of the seawater may be measured and an acid or a base may be added in order to maintain the pH of the seawater within a desired range.

Inland site 110 may comprise one or more injectors (e.g., high-pressure pumps) configured to inject a drilling fluid or a hydraulic fracturing fluid into wellbore 112 at the high pressures necessary to facilitate drilling or hydraulic fracturing. In an aspect, wellbore 112 comprises an injector and the injector is fluidically connected to storage tank 106 and mixer 108. An injector may be a high-pressure pump removably positionable at wellbore 112.

Fresh water may be extracted from local aquifer 104 via private wells or public water wells. In many areas of significant drilling and hydraulic fracturing, ten percent or more of the local aquifer 104 is devoted to supporting these activities. As much as thirteen million gallons of locally-sourced fresh water may be injected into wellbore 112 during hydraulic fracturing. 40 to 50% of this water eventually returns to the surface as produced water. Produced water typically has a much higher concentration of salt, other compounds, elements, and impurities. Such water must be stored (e.g., in waste ponds, as shown in FIG. 1), removed, cleaned, pumped into disposal wells, or reused. Typically, produced water is initially stored on site, creating a risk to the local aquifer 104.

Figure 2:
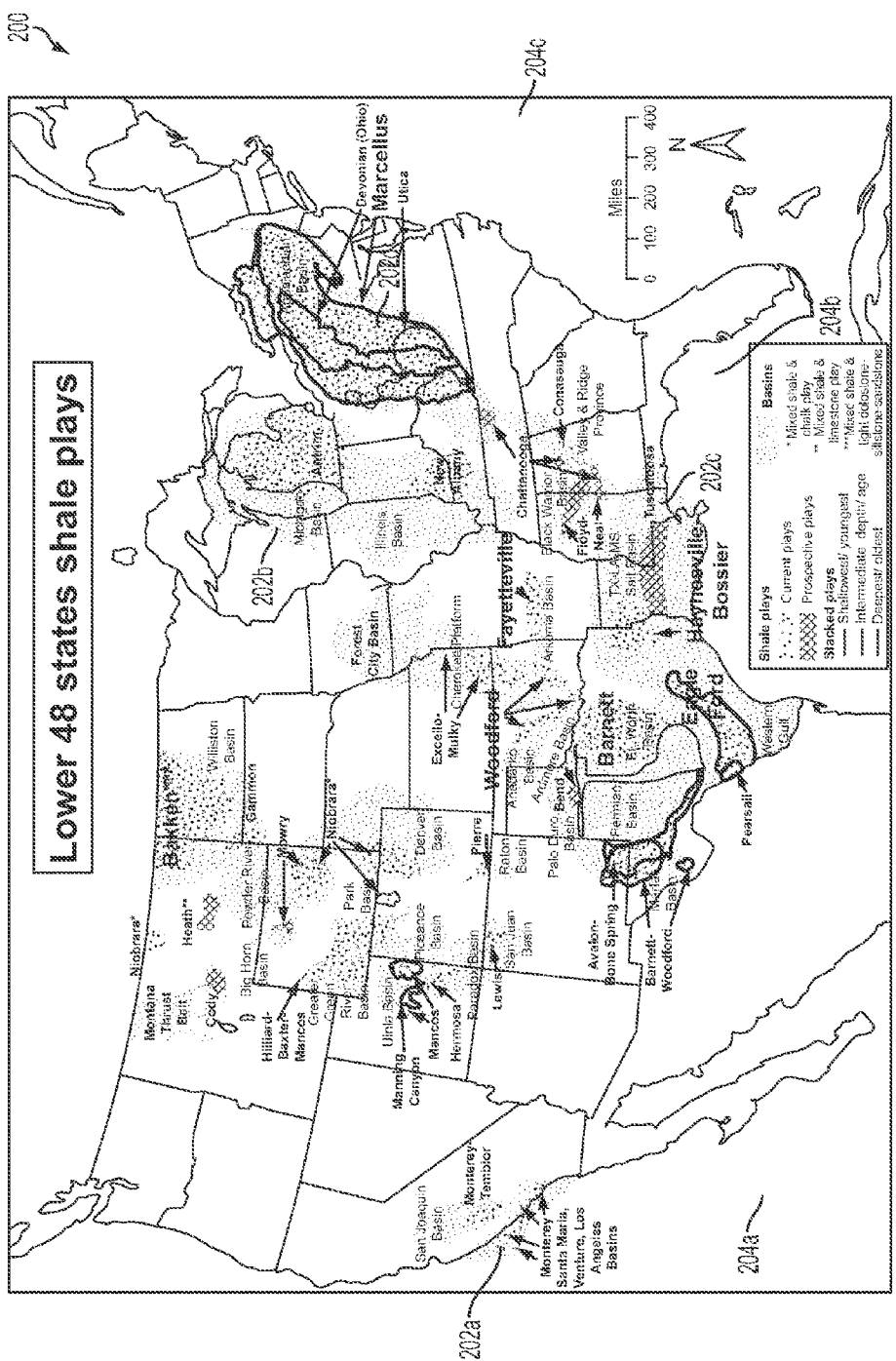
FIG. 2 is a diagram depicting locations of known hydrocarbon-containing shale formations throughout the lower 48 states, according to an aspect of the present disclosure.

Referring now to FIG. 2, a diagram 200 depicting the locations of known subterranean hydrocarbon-bearing formations (e.g., shale formations) throughout the lower 48 states, according to an aspect of the present disclosure, is shown.

FIG. 2 shows multiple subterranean hydrocarbon-bearing formations 102, namely shale formations 202 (shown, for clarity, as shale formations 202*a-d* in FIG. 2), suitable for exploration and extraction of hydrocarbons via drilling and hydraulic fracturing. Shale formations 202 are accessible from land-based drilling sites. Such sites are often significantly inland, requiring the use of local aquifers for drilling and fracturing fluids. Water sources 204 (shown, for clarity, only as water source 204*a-c* in FIG. 2) such as the Gulf of Mexico 204*b*, the Atlantic Ocean 204*c*, and the Pacific Ocean 204*a*, may provide seawater suitable for usage in land-based drilling and hydraulic fracturing processes.

Figure 3:
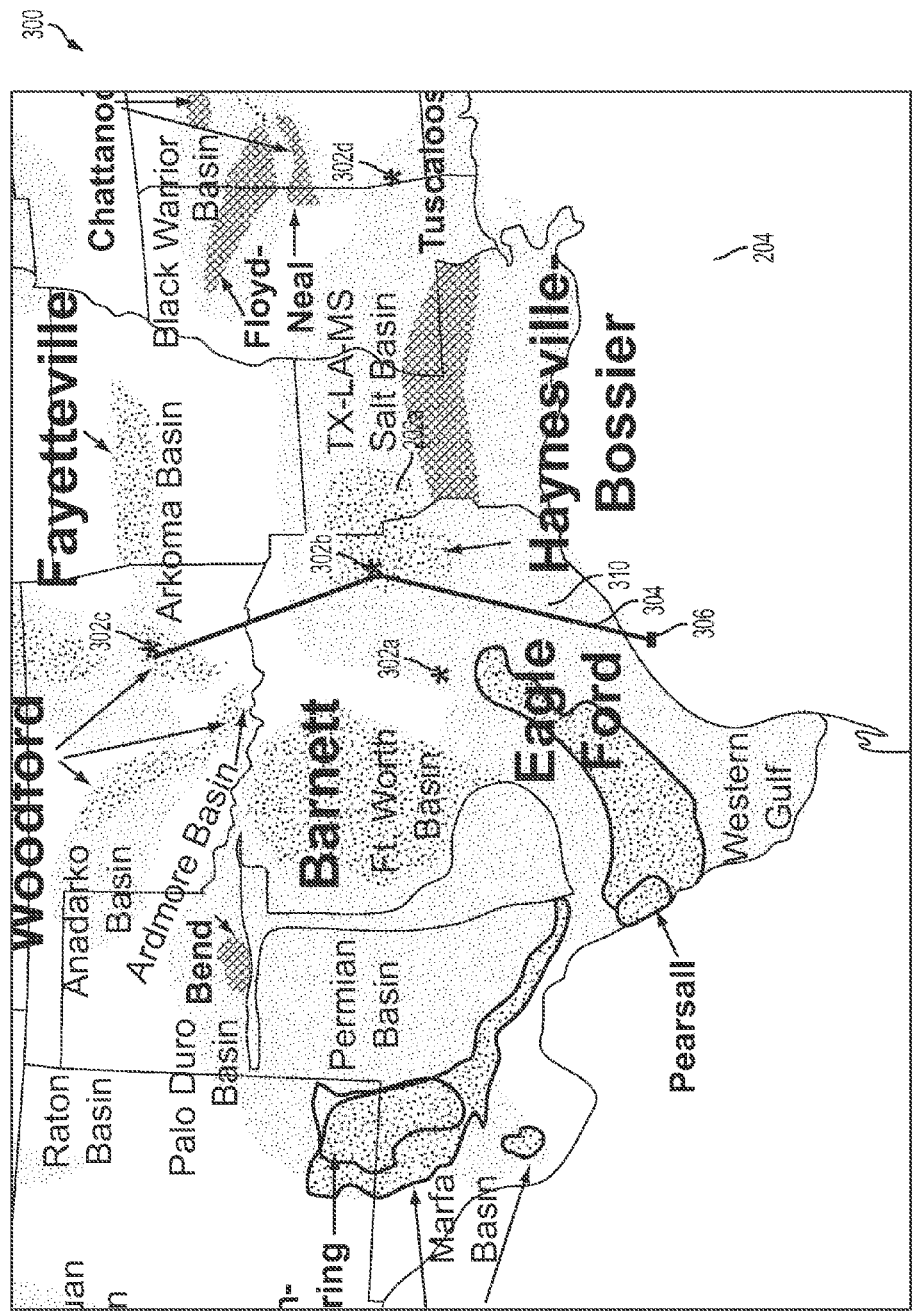
FIG. 3 is a diagram depicting the location of multiple inland sites and a seawater transportation system, according to an aspect of the present disclosure.
Figure 4:
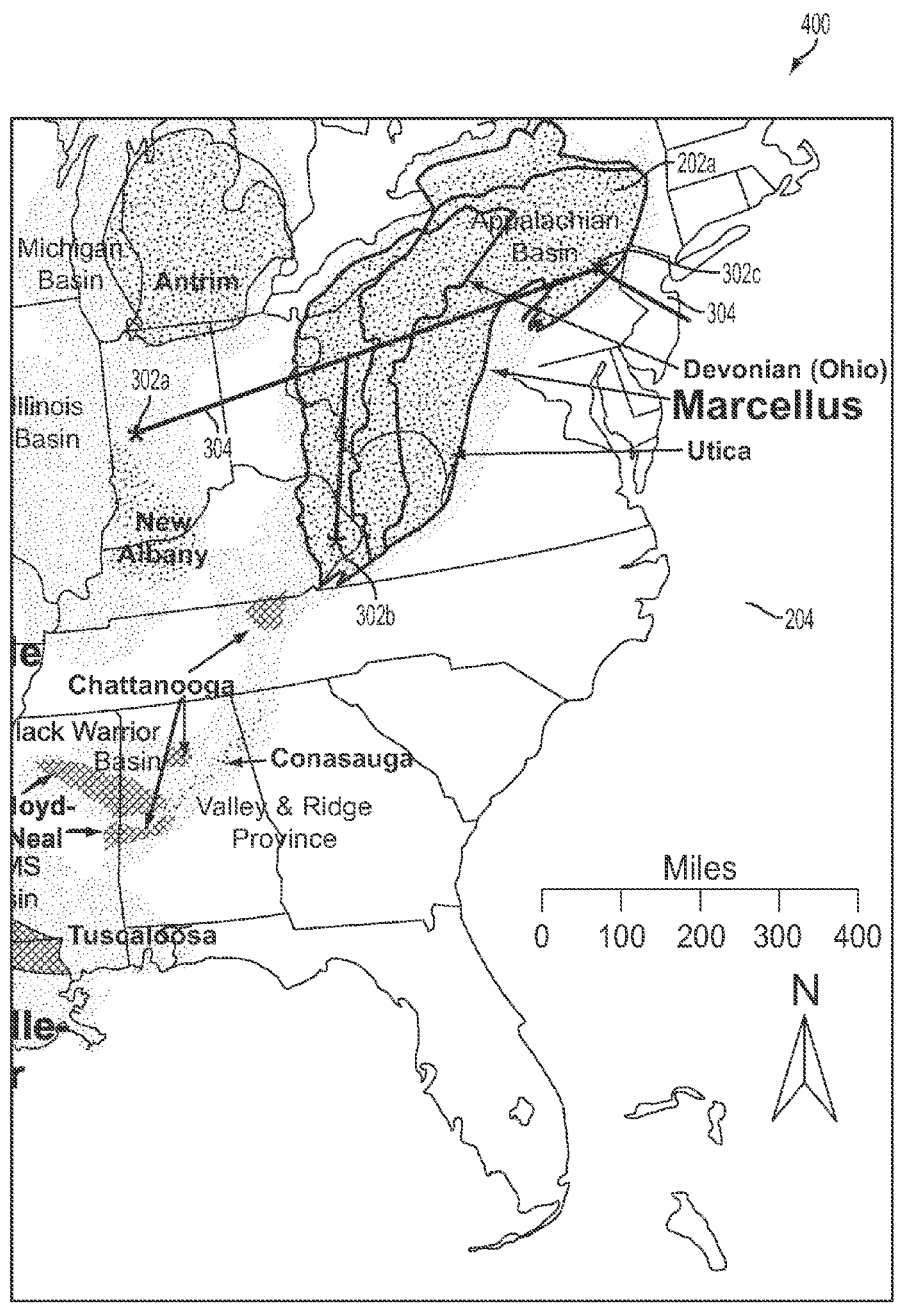
FIG. 4 is a diagram depicting the location of multiple inland sites and a seawater transportation system, according to an aspect of the present disclosure.

Referring now to FIGS. 3 & 4, diagram 300 and diagram 400, respectively, depict the location of multiple inland sites 110 and seawater transportation systems 310, according to aspects of the present disclosure, are shown.

Inland site 110 may be a land-based drilling and hydraulic fracturing site 302 (shown, for clarity, only as hydraulic fracturing sites 302*a-d* in FIG. 3). Inland sites 110 are typically located hundreds or thousands of miles inland, above shale formations 202.

The terms "inland site," "drilling and hydraulic fracturing site," or "hydraulic fracturing site" and/or the plural form of these terms are used interchangeably throughout herein to refer to drilling sites, well sites, hydrocarbon extraction sites, and the like wherein drilling fluids, fracturing fluids, pressurizing fluids, and the like are utilized.

Seawater transportation system 310 is configured to transport seawater from a source 204 to one or more hydraulic fracturing sites 302. Transportation system 310 may comprise at least one pipeline 304 which interconnects an extraction station 306 located at or near source 204 to hydraulic fracturing site 302 located inland. Hydraulic fracturing site 302 may be located tens or hundreds of miles away from water source 204. Drilling and hydraulic fracturing sites, such as hydraulic fracturing site 302, may comprise seawater storage tanks 106 (not shown in FIG. 3) that store seawater from transportation system 310. Seawater stored in such seawater storage tanks 106 may be used at a later time at hydraulic fracturing site 302, transported to another hydraulic fracturing site 302 not located near pipeline 304 via another transportation mechanism (e.g., rail, truck, air, and the like), or transported or used by other facilities/industries (e.g., a desalinization plant, fisheries, and the like).

As will be appreciated by those skilled in the relevant art(s) after reading the description herein, transportation system 310 may comprise additional elements found in aqueducts, oil pipelines, and other pipeline-based transportation systems. For example, transportation system 310 may comprise an initial injection station, pump stations, partial delivery stations, block valve stations, regulator stations, final delivery stations and the like. Transportation system 310 may comprise branching pipeline 304, as shown in FIG. 4, thereby enabling seawater to flow to multiple locations for utilization at multiple hydraulic fracturing sites 302. Transportation system 310 may be used to transport produced water from a first hydraulic fracturing site 302 to a second hydraulic fracturing site 302. Additives may be introduced into the produced water in order to enable the produced water to be used as fracturing fluid at the second hydraulic fracturing site 302.

In an aspect, extraction station 306 is located at source 204. In another aspect, extraction station 306 is located a distance from source 204 and is configured to receive seawater and pass such seawater into other portions of transportation systems disclosed herein (e.g., systems comprising pipelines, systems comprising railcars, and the like).

In an aspect, a 48 inch diameter pipeline 304 originates at extraction station 306 (e.g., a pumping station, pump, underwater pipe, or the like) located at Gulf of Mexico 204, enabling seawater to be pumped from Gulf of Mexico 204 into pipeline 304. Pipeline 304 extends inland to an area near a hydrocarbon-laden rock formation 202, such as the Haynesville Shale Formation located under parts of southwestern Arkansas, northwest Louisiana, and east Texas. Transported seawater is received at hydraulic fracturing site 302 located near rock formation 202 and is then used to augment or replace fresh water utilization drilling processes, hydraulic fracturing processes, and the like. That is, the drilling or fracturing fluids used may comprise seawater sourced from Gulf of Mexico 204 and fresh water. In another aspect, such fluids may comprise seawater sourced from Gulf of Mexico 204 and do not comprise any fresh water.

In an aspect, existing pipelines may be adapted for utilization with the present disclosure. That is, seawater may be transported from water source 204 to hydraulic fracturing sites 302 using existing pipelines. In some aspects, a portion of seawater transportation system 310 in accordance with the present disclosure is constructed which interconnects seawater source 204 with an existing pipeline. A delivery pipeline may be constructed originating at a portion of the existing pipeline proximal to hydraulic fracturing site 302 and terminating at hydraulic fracturing site 302.

In an aspect, seawater transportation system 310 is configured to transport seawater from seawater source 204 to a hydraulic fracturing site 302. Utilization of such seawater generates produced water having higher concentrations of salt, other compounds, and elements. Produced water must disposed of, reused, or cleaned. Additional portions of seawater transportation system 310 may be used to transport produced water to a second site. The second site may be a disposal site, a storage site, a desalinization site, a fishery, a site operated by another industry, another hydraulic fracturing site, and the like.

Figure 5A:
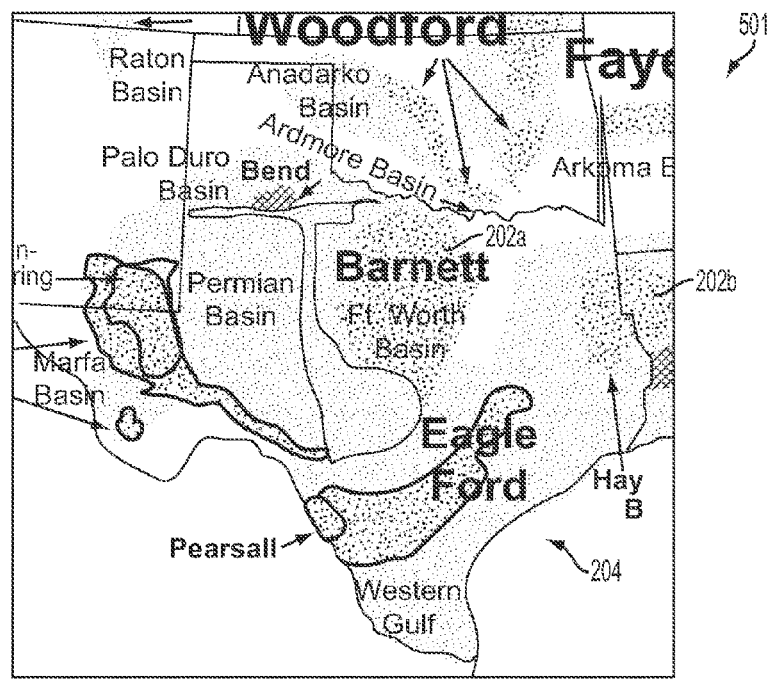
FIGS. 5A&B are diagrams depicting, respectively, the locations of known hydrocarbon-containing shale formations in the State of Texas and the freight rail system in the State of Texas, according to an aspect of the present disclosure.
Figure 5B:
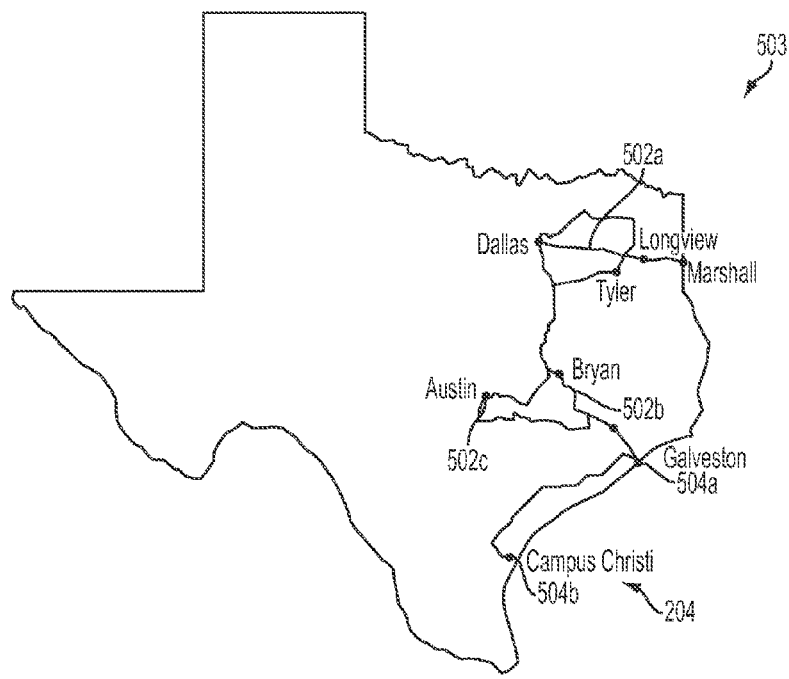

Referring now to FIGS. 5A & 5B, diagrams 501 and 503 depicting, respectively, the locations of known hydrocarbon-containing shale formations in the State of Texas and the freight rail system in the State of Texas, according to an aspect of the present disclosure, are shown.

Diagram 501 is a detailed view of known hydrocarbon-containing shale formations 202 (shown, for clarity, as shale formations 202a-b in FIG. 5A). For example, the Barnett shale formation 202a is approximately five thousand square miles and underlies Fort Worth, Tex. as well as at least 17 counties in the State of Texas.

Diagram 503 details freight railways 502 (shown, for clarity, as railways 502a-c in FIG. 5B) throughout the State of Texas. Typically, railways 502 are designed to transport materials from shipping centers or manufacturing facilities to population centers or finishing facilities. For example, railway 202 may start at a port 504 (shown, for clarity, as ports 504a-b in FIG. 5B), such as the Port of Galveston 504a and extend to a population center, such as Fort Worth, Tex. Railway 202 comprises various stops, switches, and branches along the way, enabling cargo to be loaded and unloaded along railway 202.

Port 504 may comprise terminal switching railroads, such as the Galveston Railroad, which facilitate transportation of cargo to and from ships at port 504. Port 504 may comprise function-specific railways, which allow engines and railcars to transit between railway 202 and a company-specific facility, such as extraction station 306.

As shown in diagram 503, a plurality of railways 502 pass over shale formations 202 shown in diagram 501. Many stops exist over shale formations 202. Hydraulic fracturing sties 302 (not shown in FIGS. 5A & 5B) may be located near existing railway stops. In an aspect, additional railway stops may be constructed near hydraulic fracturing sites 302. In another aspect, transportation systems may be constructed to move seawater from an existing railway stop to hydraulic fracturing site 302 (e.g., temporary, flexible pipelines, rigid pipelines, truck routes, and the like).

Figure 6:
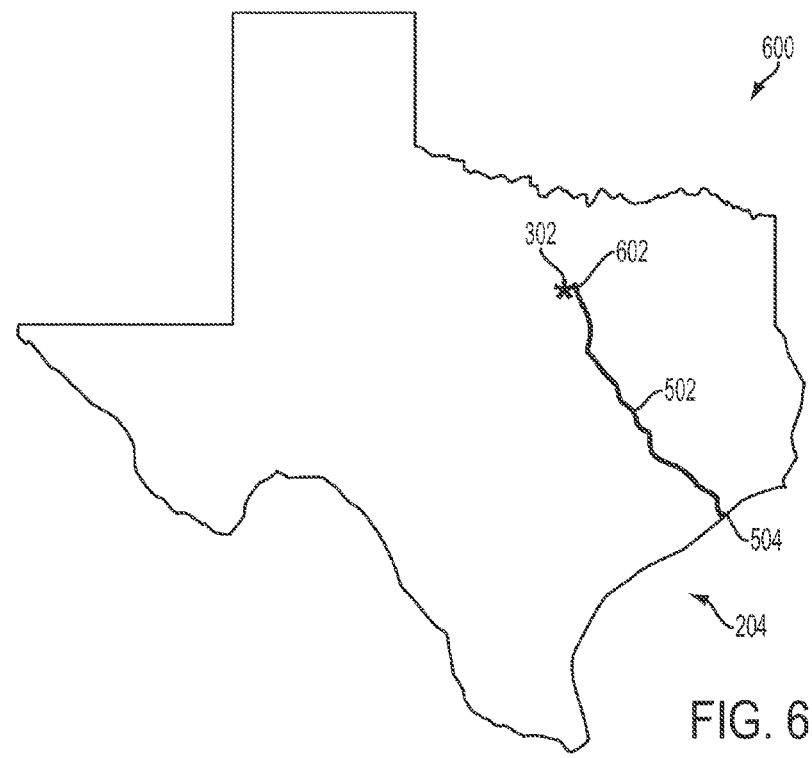
FIG. 6 is a diagram depicting the location of multiple hydraulic fracturing sties and a seawater transportation system comprising railways, according to an aspect of the present disclosure.

Referring now to FIG. 6, a diagram 600 depicting the location of multiple hydraulic fracturing sties 302 and seawater transportation system 310 comprising railways 502, according to an aspect of the present disclosure, is shown.

Seawater may be transported from source 204 to inland hydraulic fracturing site 302 via seawater transportation system 310. Seawater may be used at hydraulic fracturing site 302 to facilitate hydrocarbon extraction in lieu of locally-sourced fresh water.

In an aspect, seawater transportation system may comprise railway 502, which originates at the Port of Galveston, passes through Bryan, Tex., Waco, Tex., and terminates near Fort Worth, Tex., above the Barnett Shale Formation 202. Railway 502 may receive seawater at Port of Galveston 504 and carry seawater by tanker cars to hydraulic fracturing site 302 located at Barnett Shale Formation 202, thereby supplying a consistent large volume of seawater for hydraulic fracturing operations.

In an aspect, seawater is pumped from source 204 via extraction station 306 and loaded onto railroad cars at a loading station (not shown). Upon loading, the railcars are driven to an unloading station 602 comprising a railway stop. At unloading station 602, the seawater is unloaded and utilized at hydraulic fracturing site 302.

Figure 7:
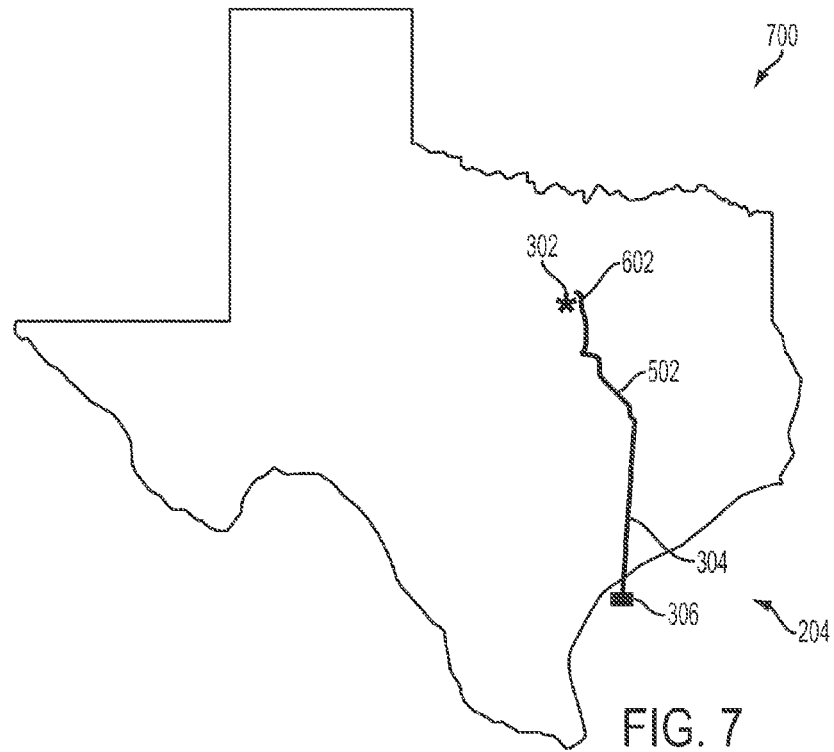
FIG. 7 is a diagram depicting the location of multiple inland sites and a seawater transportation system comprising multiple transportation devices, according to an aspect of the present disclosure.

Railcars may be tanker cars or another vehicle configured to transport seawater. Railway 502 may originate at port 504 or at a different location. Seawater may be transported the majority of the distance between source 204 and hydraulic fracturing site 302 via railway. In another aspect shown in FIG. 7, railway 502 transports seawater only a portion of the distance between source 204 and hydraulic fracturing site 302. Seawater transportation system 310 may additionally comprise at least one pipeline 304 configured to carry seawater. Seawater transportation system 310 may comprise additional elements enabling the seawater to be inserted and removed from pipeline 304 and loaded and unloaded from railroad cars. Seawater may be transferred multiple times between pipelines 304 and railcars or other transportation mechanisms as it is transported from source 204 to inland site 110.

In an aspect, seawater transportation systems 310 comprise alternative transportation devices including, but not limited to: air transportation; commercial vehicles; and ships. Such transportation devices may carry seawater the entire distance between source 204 and inland hydraulic fracturing site 302, or a portion of the distance.

Figure 8:
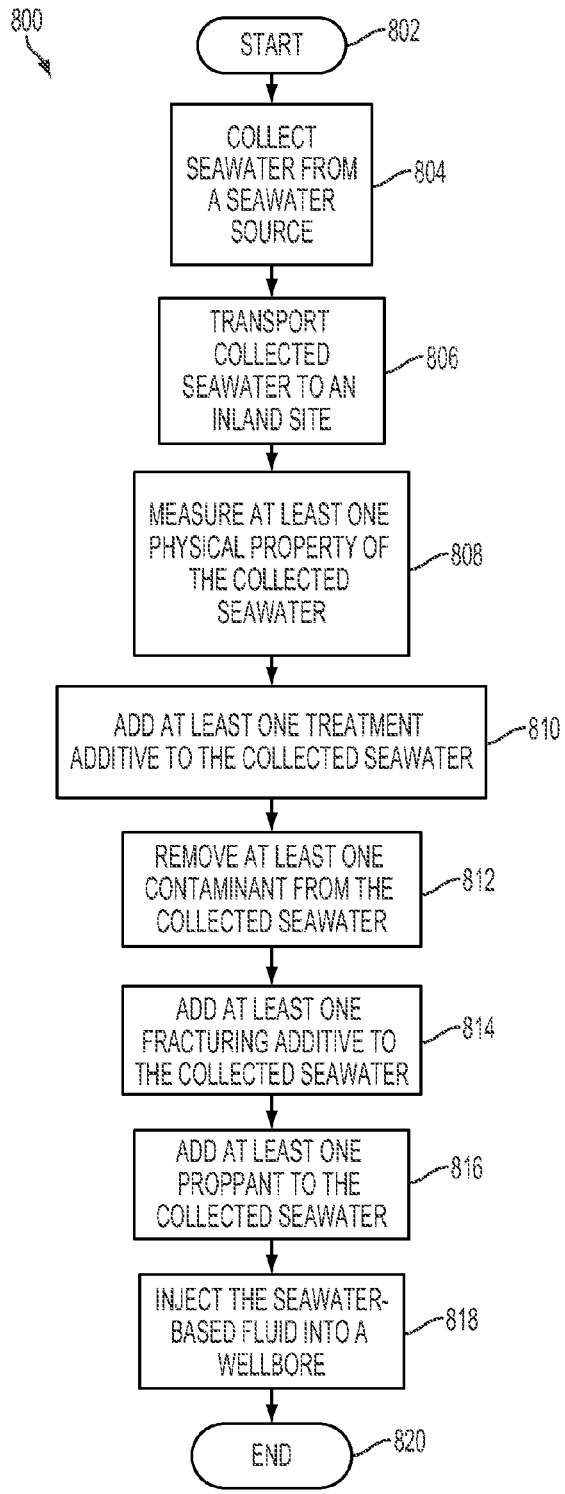
FIG. 8 is a flowchart illustrating an exemplary process for utilizing seawater collected from a seawater source at an inland site for drilling or hydraulic fracturing operations, according to an aspect of the present disclosure.

Now referring to FIG. 8, a flowchart illustrating an exemplary process 800 for utilizing seawater collected from seawater source 204 at inland site 110 for drilling or hydraulic fracturing operations, according to an aspect of the present disclosure, is shown.

Process 800 may utilize some or all of the following: seawater transportation system 310; roads; extraction station 306; pipeline 304. Such elements may be located at one or more of the following: seawater source 204; port 504; railway 502; loading station; unloading station 602; inland site 110; hydraulic fracturing site 302; shale formation 202; and the like. Process 800 begins at step 802 and passes immediately to step 804.

At step 804, seawater is collected from a seawater source. In an aspect, collection is carried out by extraction station 306, namely a seawater pump, positioned in or near seawater source 204 (e.g., the United States Gulf of Mexico). In another aspect, seawater may be collected by marine vessels or other means that will be apparent to those skilled in the relevant art(s) after reading the description herein.

At step 806, the collected seawater is transported to inland site 110. In an aspect, inland site 110 is located more than one hundred miles from seawater source 204. Inland site 110 may be located in an area of low annual rainfall, such as the Eagle Ford Shale or the Permian Basin. The collected seawater may be transported using seawater transportation system 310. In an aspect, collected seawater may be transported at least a portion of the way by pipeline 304. Pipeline 304 may comprise above ground piping, underground piping, temporary piping, and the like. In another aspect, the collected seawater may be transported at least part of the way via railcar.

At step 808, at least one sensor may be deployed to measure at least one physical property of the collected seawater. In an aspect, the sensor may be deployed at extraction station 306. In another aspect, one or more sensors may be deployed along transportation system 310. In another aspect, one or more sensors may be deployed at inland site 110. The sensors may measure volume, temperature, chemical content, pH level, salinity level, contaminant levels, and the like, thereby enabling the collected seawater to be treated and/or utilized.

At step 810, at least one additive is added to the collected seawater in order to maintain the physical properties of the collected seawater within a desired range. Additives may include a base, an acid, or another material that will be apparent to those skilled in the relevant art(s) after reading the description herein. Step 810 may be carried out at, for example, inland site 110.

At step 812, at least one contaminant is removed from the collected seawater. The at least one contaminant may be removed by base fluid processing equipment. In an aspect, such equipment is located at inland site 110. In another aspect, such equipment is located at extraction station 306, thereby removing contaminants before the collected seawater is transported via, for example, pipeline 304 or via railcar.

At step 814, at least one fracturing additive, such as a slickwater additive is added to the collected seawater.

At step 816, at least one proppant, such as silica sand, is added to the collected seawater.

Steps 814 and 816 convert the collected seawater into a seawater-based hydraulic fracturing fluid. In another aspect, steps 814 and 814 may convert the collected seawater into a drilling fluid.

At step 818, seawater-based fluid, such as the seawater-based hydraulic fracturing fluid, is injected into wellbore 112 in order to facilitate subterranean operations, such as drilling or hydraulic fracturing. Process 800 then terminates at step 820.

All or portions of process 800 may be carried out by, for example, seawater collection companies, rail operators, pipeline operators, wellhead or drill site operators, drilling fluids engineers, and the like.

As will be apparent to those having skill in the relevant art(s) after reading the description herein, process 800 may be modified by removing, rearranging, adding, or substituting steps. For example, in another aspect, process 800 omits steps 808, 810 and 812. In another aspect process 800 omits steps 814 and 816.

As will be apparent to those having skill in the relevant art(s) after reading the description herein, collected seawater, mixtures comprising collected seawater, and the like may be stored during process 800 in, for example, storage tank 106.

Figure 9:
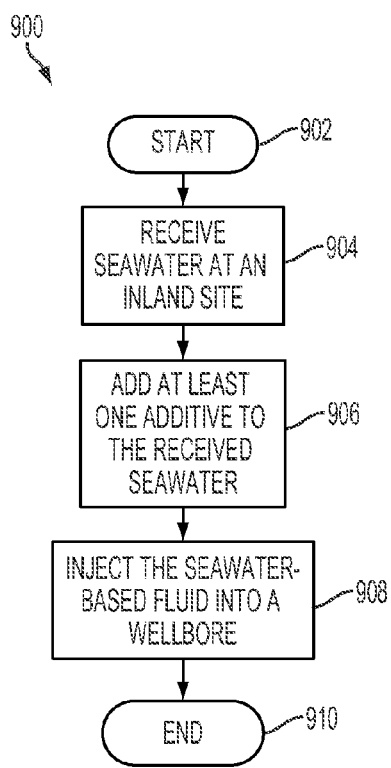
FIG. 9 is a flowchart illustrating an exemplary process for utilizing seawater collected from a seawater source at an inland site for drilling or hydraulic fracturing operations, according to an aspect of the present disclosure.

Now referring to FIG. 9, a flowchart illustrating an exemplary process 900 for utilizing seawater collected from seawater source 204 at inland site 110 for drilling or hydraulic fracturing operations, according to an aspect of the present disclosure, is shown.

Some or all of the steps of process 900 are carried out at inland site 110. In an aspect, inland site 110 operator carries out process 900. Process 900 begins at step 902 and passes immediately to step 904.

At step 904, seawater collected from seawater source 204 is received at inland site 110. Seawater may be received at an unloading site via railcar. In another aspect, seawater may be received via pipeline 304. In another aspect, seawater is received via tanker trucks.

At step 906, at least one additive, such as a pH balancing additive, slickwater additive or proppant, is added to the collected seawater. Step 906 may be carried out at inland site 110. In another aspect, step 906 may be carried out at extraction station 306, or some other location. Seawater typically has a salinity of 30 to 50 ppt whereas freshwater has a salinity of 0 to 0.5 ppt. In an aspect, an additive is mixed with the collected seawater in order to account for the salinity of the collected seawater, or to facilitate usage of collected seawater when considering its salinity.

At step 908, seawater-based fluid, such as the seawater-based hydraulic fracturing fluid, is injected into wellbore 112 in order to facilitate subterranean operations, such as drilling or hydraulic fracturing. Process 900 then terminates at step 910.

Figure 10:
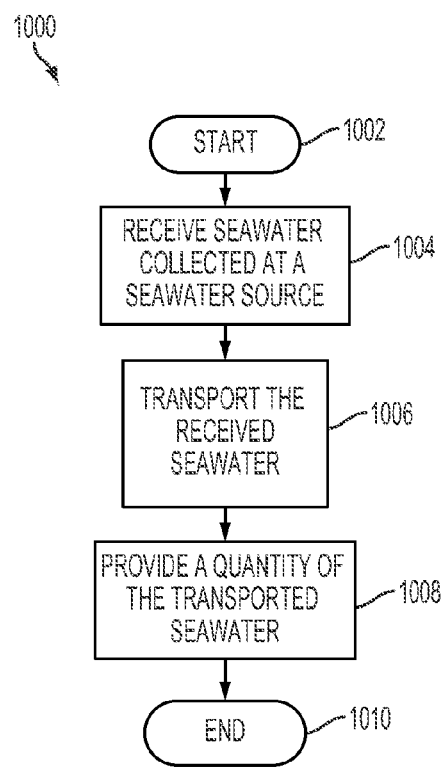
FIG. 10 is a flowchart illustrating an exemplary process for transporting received seawater collected from a seawater source, wherein the destination of the received seawater is an inland site, according to an aspect of the present disclosure.

Now referring to FIG. 10, a flowchart illustrating an exemplary process 1000 for transporting received seawater collected from seawater source 204, wherein the destination of the received seawater is inland site 110, according to an aspect of the present disclosure, is shown.

Some or all of the steps of process 1000 may be carried out by a transportation company, bulk carrier, or similar. Process 1000 begins at step 1002 and passed immediately to step 1004.

At step 1004, seawater which has been collected from seawater source 204 is received. In an aspect, the collected seawater is received at a loading station located at port 504 for loading onto a plurality of railcars. In another aspect, the collected seawater is received at a loading station located inland from the port seawater source. The collected seawater may be delivered by another transportation mechanism, such as pipeline 304.

At step 1006, the collected seawater is transported in order to facilitate delivery of the collected seawater at inland site 110.

At step 1008, the transported, collected seawater is provided. In an aspect, this occurs at inland site 110 and the collected seawater is provided to an end user such as a wellhead operator, a drill operator, an oil and gas company, or the like. In another aspect, the collected seawater is only transported a portion of the way to inland site 110, therefore the collected seawater may be transferred to another transportation mechanism in order to facilitate delivery of the collected seawater at inland site 110 for usage by an end user. Process 1000 then terminates at step 1010.

This disclosure should not be limited to the specifically named transportation mechanisms discussed. As will be appreciated by those skilled in the relevant arts after reading the description herein, alternative transportation mechanisms, now known and developed in the future, may be used to transport seawater, or other fluids or compositions of matter which may serve as a basis for fracturing fluid, from plentiful seawater source 204 to inland hydraulic fracturing site 302. Such mechanisms may be utilized to transport seawater a portion of the distance, or the entire distance.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., transportation of other fluids or compositions of matter to inland hydraulic fracturing sites; utilization of transportation mechanisms and devices other than those mentioned herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A fluid transportation system for transporting seawater from a seawater source to an inland oilfield having an inland oilfield wellbore, the system comprising:
   a pumping station, positioned at the seawater source, configured to collect seawater originating from the seawater source;
   pipeline, having a first pipeline connection portion and a second pipeline connection portion, connected at the first pipeline connection portion to the pumping station for transporting the collected seawater, the second pipeline connection portion positioned at the inland oilfield; and
   an injector positioned at the inland oilfield wellbore, configured to receive the collected seawater after the collected seawater has been transported via the pipeline, and further configured to inject the collected seawater into the inland oilfield wellbore for subterranean operations;
   wherein the seawater source is one of: an ocean; a saltwater lake; and a sea; and
   wherein the Inland oilfield has at least one additional wellbore which has, during initial wellbore creation, previously solely utilized a locally-sourced, freshwater-based fluid for subterranean operations, the locally-sourced, freshwater-based fluid not containing produced water.

2. The fluid transportation system of claim 1, further comprising:
   at least one storage tank, fluidically connected to the pipeline, configured to store at least a portion of the collected seawater before injection into the inland oilfield wellbore for subterranean operations.

3. The fluid transportation system of claim 2, wherein the at least one storage tank is located at the inland oilfield.

4. The fluid transportation system of claim 1, further comprising:
   at least one mixer fluidically connected to the pipeline and configured to add at least one fracturing additive to the collected seawater, configured to add at least one proppant to the collected seawater;
   wherein such addition thereby forms a seawater-based hydraulic fracturing fluid; and
   wherein such addition occurs before injection of the collected seawater into the inland oilfield wellbore for subterranean operations.

5. The fluid transportation system of claim 4, wherein the at least one fracturing additive is one of:
   a biocide; a buffer; a corrosion inhibitor; a crosslinker; a friction reducer; a gelling agent; a scale inhibitor; and a surfactant.

6. The fluid transportation system of claim 4, further comprising:
   at least one collected seawater sensor, positioned to measure at least one physical property of the collected seawater.

7. The fluid transportation system of claim 6, wherein the mixer is further configured to add at least one treatment additive to the collected seawater based on the at least one physical property of the collected seawater measured by the at least one collected seawater sensor.

8. The fluid transportation system of claim 1, wherein the inland oilfield wellbore is a drilling and hydraulic fracturing wellbore.

9. The fluid transportation system of claim 8, wherein the drilling and hydraulic fracturing wellbore is a natural gas well.

10. The fluid transportation system of claim 1, wherein the inland oilfield wellbore is located in an area of low annual rainfall having less than 25 inches of rainfall annually.

11. The fluid transportation system of claim 1, wherein the inland oilfield wellbore is at least twenty-five miles from the seawater source.

12. The fluid transportation system of claim 1, further comprising:
   a collected seawater sensor, positioned to measure at least one physical property of the collected seawater.

13. A fluid transportation system for transporting seawater from an ocean to an inland oilfield having an inland oilfield wellbore, the system comprising:
   a pumping station, positioned at an ocean, configured to collect seawater from the ocean;
   pipeline, having a first pipeline connection portion and a second pipeline connection portion, connected at the first pipeline connection portion to the pumping station for transporting the collected seawater, the second pipeline connection portion positioned at the inland oilfield;
   at least one storage tank, fluidically connected to the pipeline, configured to store at least a portion of the collected seawater before injection into the inland oilfield wellbore for subterranean operations;
   at least one mixer fluidically connected to the piping and configured to add at least one additive to the collected seawater, thereby forming a seawater-based fluid; and
   an injector positioned at the inland oilfield wellbore, located at least twenty-five miles from the ocean, configured to receive the collected seawater after the collected seawater has been transported via the pipeline, and further configured to inject the seawater-based fluid into the inland oilfield wellbore for subterranean operations;
   wherein the inland oilfield has at least one additional wellbore which has, during initial wellbore creation, previously solely utilized locally-sourced, freshwater-based fluid for subterranean operations, the locally-sourced, freshwater-based fluid not containing produced water.

14. A method of utilizing seawater transported at least in part by pipeline to an inland oilfield, the method comprising:
   (a) receiving the seawater at the inland oilfield, the seawater extracted from a seawater source, the seawater being transported, at least a substantial distance from the seawater source to the inland oilfield via pipeline, the inland oilfield having an inland oilfield wellbore;
   (b) adding at least one additive to the seawater, thereby forming a seawater-based fluid; and
   (c) injecting, at the inland oilfield wellbore, the seawater-based fluid for subterranean operations;
   wherein the seawater source is one of: an ocean; a saltwater lake; and a sea; and
   wherein the inland oilfield has at least one additional wellbore which has, during initial wellbore creation, previously solely utilized locally-sourced, freshwater-based fluid for subterranean operations, the locally-sourced, freshwater-based fluid not containing produced water.

15. The method of claim 14, further comprising the step of:
   (d) adding at least one proppant to the seawater-based fluid.

16. The method of claim 14, wherein the seawater-based fluid is a hydraulic fracturing fluid.

17. The method of claim 14, wherein the initial wellbore creation of the at least one additional wellbore comprised hydraulic fracturing operation.

18. The method of claim 14, wherein the seawater is transported via pipeline at least twenty-five miles.

* * * * *